(12) United States Patent
Taylor et al.

(10) Patent No.: US 7,698,176 B2
(45) Date of Patent: Apr. 13, 2010

(54) METHOD, SYSTEM, AND COMPUTER-READABLE MEDIUM FOR UPDATING INVENTORY DATA IN AN INVENTORY MANAGEMENT SYSTEM

(75) Inventors: Kathryn M. Taylor, Charlotte, NC (US); Barbara M. Crosby, West Columbia, SC (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1392 days.

(21) Appl. No.: 10/628,852

(22) Filed: Jul. 28, 2003

(65) Prior Publication Data
US 2005/0027620 A1 Feb. 3, 2005

(51) Int. Cl.
*G06Q 10/00* (2006.01)
(52) U.S. Cl. .............................. 705/28; 707/2; 235/385
(58) Field of Classification Search .................. 705/28; 707/2; 235/385
See application file for complete search history.

(56) References Cited

U.S. PATENT DOCUMENTS

| | | | |
|---|---|---|---|
| 5,216,612 A * | 6/1993 | Cornett et al. ................ 700/96 |
| 5,884,300 A * | 3/1999 | Brockman ..................... 707/2 |
| 6,681,990 B2 * | 1/2004 | Vogler et al. ................. 235/385 |
| 6,996,538 B2 * | 2/2006 | Lucas .......................... 705/28 |
| 2002/0032611 A1 * | 3/2002 | Khan .......................... 705/26 |
| 2003/0023503 A1 * | 1/2003 | Alling ......................... 705/26 |
| 2003/0208417 A1 * | 11/2003 | Heinrichs et al. ............. 705/28 |

OTHER PUBLICATIONS

Peregrine Systems and Shaman Corporation Form Alliance to Proactively Manage Software Reliability Across The Enterprise by PR Newswire. New York: Sep. 8, 1999, p. 1.*

* cited by examiner

*Primary Examiner*—Vanel Frenel
(74) *Attorney, Agent, or Firm*—Fay Kaplun & Marcin, LLP (57) ABSTRACT

A method and computer system are provided for updating inventory data in an inventory management system through the use of a computer software application program. A request is initiated for receiving inventory models from an inventory management system. The inventory models may include default configuration data for inventoried equipment in the inventory management system. Next, the inventory model data is received from the inventory management system. Next, an inventory update form is generated for a selected inventory model. Then, the inventory update form is populated with updated inventory data. Finally, the updated inventory data is sent to the inventory management system to update the inventory. The updated inventory data may include specific configuration data for inventoried equipment in the inventory management system.

18 Claims, 11 Drawing Sheets

METHOD, SYSTEM, AND COMPUTER-READABLE MEDIUM FOR UPDATING INVENTORY DATA IN AN INVENTORY MANAGEMENT SYSTEM

TECHNICAL FIELD

The present invention is related to inventory management systems. More particularly, the present invention is related to updating equipment inventory in an inventory management system.

BACKGROUND OF THE INVENTION

Many communications companies utilize inventory management processes for managing communications equipment in their networks. For example, a telecommunications company may maintain configuration data relating to vendor supplied central office equipment in an inventory management system. The inventory management system may include specific configuration data for a piece of equipment such as the equipment's location as well as the physical assignments (i.e., how the equipment is cabled) and operating parameters for the piece of equipment in the central office.

Often, due to increased capacity requirements, new pieces of equipment must be purchased from a vendor and inventoried before it is installed in the communications network. For example, typically, before a new piece of equipment is installed in a telecommunications network, a capacity manager or planner prepares an equipment update order form for the vendor which includes standard or model configuration data associated with the new piece of equipment. The model configuration data may include an equipment code, the location of the equipment in the central office, and cabling assignments. Once the planner completes the equipment update order form, it is typically sent to the vendor where the form is updated or customized with the specific operating parameters for the equipment. Once the vendor has updated the equipment update order form, it is typically sent back to the planner for approval after which the model and specific configuration data may be entered into a computerized inventory management system.

Current methods for updating inventory in a telecommunications network, however, suffer from several drawbacks. First, the equipment update order forms are typically prepared manually by planner and vender personnel increasing the likelihood of configuration data entry errors, which when discovered, take additional time to correct. Second, the communications of the forms themselves between the planners and vendors are often made via facsimile which may also lead to data entry errors resulting from a poor quality facsimile transmission. Finally, even after an inventory update form has been approved, it must still be manually entered into the inventory management system which again introduces human error in the data entry process.

It is with respect to these considerations and others that the present invention has been made.

SUMMARY OF THE INVENTION

In accordance with the present invention, the above and other problems are solved by methods for automating the updating of inventory data in an inventory management system through the use of a computer software application such that manual data entry errors and overall work are reduced. According to one method, a method of updating inventory data in an inventory management system includes a computer software application for requesting inventory models from the inventory management system, selecting an inventory model from the requested inventory models, generating one or more inventory update forms for the selected inventory model, populating the one or more inventory update forms with updated inventory data, and sending the updated inventory data from the software application program to the inventory management system.

The inventory models may include default configuration data for inventoried equipment in the inventory management system. The updated inventory data may include specific configuration data for inventoried equipment in the inventory management system. The software application program may call a screen scraper program to retrieve the inventory models from the inventory management system and to send the updated inventory data to the inventory management system. In retrieving the inventory models from the inventory management system, the screen scraper program logs into the inventory management system, retrieves the inventory models from a database in the inventory management system, and saves data associated with the inventory models to a file. The software application program may then retrieve the file containing the inventory model data. In sending the updated inventory models to the inventory management system, a user may send the updated inventory data to an inventory management database and call upon the screen scraper program to send the updated inventory data from the inventory management database to the inventory management system. The user may also manually enter the updated inventory data directly into the inventory management system.

The software application program may also determine the status of the updated inventory data sent to the inventory management system. If the transmission of the updated inventory data to the inventory management system has failed, a user may attempt to correct the failure and resend the updated inventory data to the inventory management system using the software application program. The software application program may also retrieve provisioning data for inventoried equipment in the inventory management system from an external database.

In accordance with other aspects, the present invention relates to a computer system for updating inventory data. The computer system includes a remote computer for storing a database of inventory model data, a network interface, and a client computer in communication with the remote computer over the network interface. The client computer includes a memory device for storing a program file and a processor for executing the program file. The program file includes a user interface for requesting inventory model data from the database, selecting one or more inventory models from the inventory model data, generating one or more inventory update forms from each selected inventory model, populating the inventory update forms with the updated inventory data, and storing the updated inventory data in the database.

In accordance with still other aspects, the present invention relates to a system for updating inventory data in an inventory management database. The system includes a client computer, a remote computer, and a network connection for transferring data between the local computer and the remote computer. The remote computer includes an inventory management database for storing inventory model data and a software application program, residing on the remote computer, for retrieving the inventory model data from the database. The local computer includes a user interface for requesting the software application program to retrieve the inventory model data from the inventory management database, selecting one or more inventory models from the inventory model data, generating one or more inventory update forms from each selected inventory model, populating the inventory update forms with the updated inventory data, and sending the updated inventory data to the inventory management database. The software application program may be a screen scraper application program.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Embodiments of the present invention provide methods, systems, and a computer-readable medium for updating inventory data in an inventory management system. Referring now to the drawings, in which like numerals represent like elements through the several figures, aspects of the present invention and the exemplary operating environment will be described.

Figure 1:
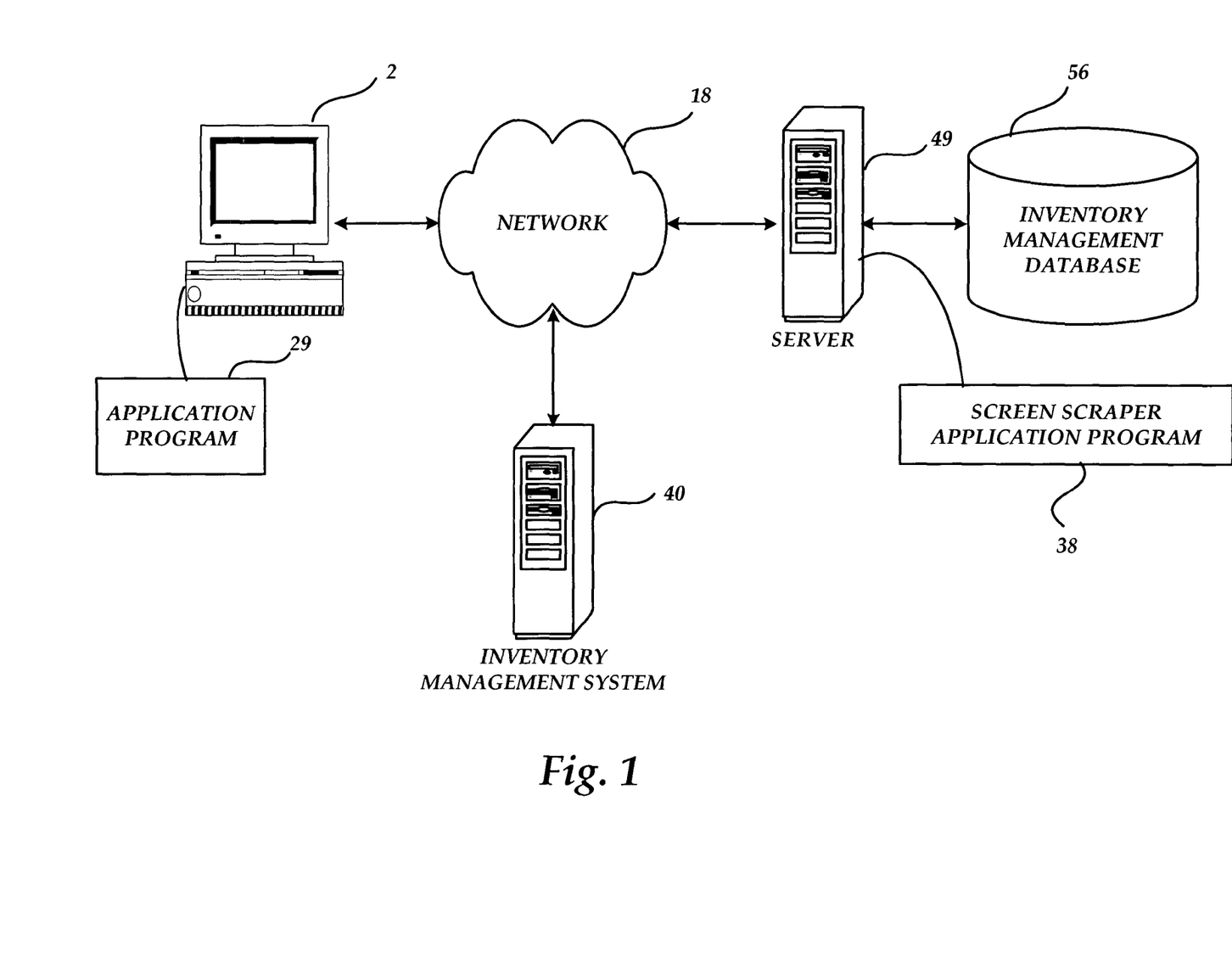
FIG. 1 illustrates a computer network architecture which may be utilized in various embodiments of the invention.

FIG. 1 and the following discussion are intended to provide a brief, general description of a suitable computing environment in which the invention may be implemented. Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer network architecture for practicing the various embodiments of the invention will now be described. The computer network includes a client computer 2 operative to execute one or more application programs, such as application program 29. The client computer 2 communicates with an inventory management system 40 and a remote or server computer 49 through a network 18. The inventory management system 40 may be a mainframe computer system running software utilized in a network (e.g., a telecommunications network) for the management of inventory, such as facilities and equipment.

In one embodiment, the software in the network management system 40 may be a TRUNK INVENTORY AND RECORD KEEPING SYSTEM ("TIRKS®") marketed by Telcordia Technologies, Inc. of Piscataway, N.J. As is known to those skilled in the art, TIRKS is integrated inventory management system software for supporting the network provisioning process for special service circuits, message trunks and carrier circuits in a telecommunications network. TIRKS also provides inventory management of facilities and equipment in a telecommunications network.

The server computer 49 stores an inventory management database 56, such as the SYBASE ADAPTIVE SERVER ENTERPRISE database marketed by Sybase Corporation of Dublin, Calif. The inventory management database 56 stores inventory data collected from the inventory management system 40 over the network 18. The inventory data may be a collection of data organized into fields, records, and files. The server computer 49 is also operative to execute a screen scraper program 38. The screen scraper program 38 is called upon by the application program 29 to retrieve inventory data from the inventory management system 40 and save it to a file on the server computer 49. The screen scraper program 38 is also called upon to send inventory data which has been updated in the application program 29, to the inventory management system 40. As is known to those skilled in the art, screen scraper programs are software for intercepting character-based data from a mainframe computer.

The client computer 2 and the server computer 49 may include programs for connecting to remote mainframe computers such as the inventory management system 40. Typically, a connection is made by entering a valid username and password to establish a "host session" with the mainframe. Once a host session is established, commands may be issued from client computer 2 and the server computer 49 to view inventory data stored on the inventory management system 40.

Figure 2:
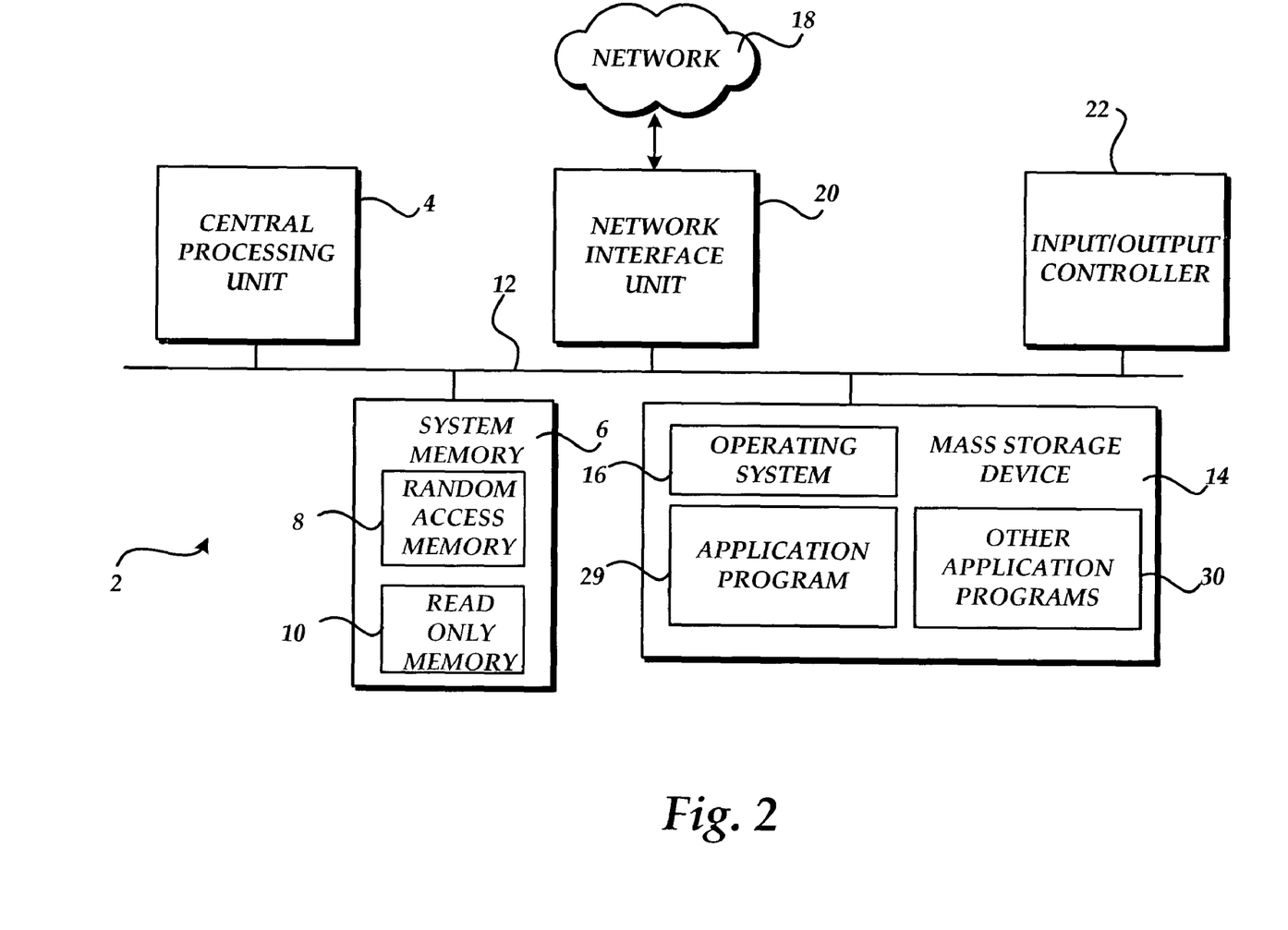
FIG. 2 illustrates a computer system architecture of a client computer utilized in various embodiments of the invention.

Turning now to FIG. 2, an illustrative computer architecture for the client computer 2 (which was discussed briefly above) for practicing the various embodiments of the invention will be described. The client computer 2 may be a standard personal computer operative to execute one or more application programs, such as the application program 29, for updating inventory in the inventory management system 40. Alternatively, the client computer 2 may include another type of computing device operative to access a network 18, such as a personal digital assistant or other type of computer. The computer architecture shown in FIG. 2 illustrates a conventional personal computer, including a central processing unit 4 ("CPU"), a system memory 6, including a random access memory 8 ("RAM") and a read-only memory ("ROM") 10, and a system bus 13 that couples the system memory 6 to the CPU 4.

The client computer 2 further includes a mass storage device 14 for storing an operating system 16, the application program 29, and other application programs 30. The operating system 16 may be suitable for controlling the operation of a networked personal computer, such as the WINDOWS NT or WINDOWS 2000 operating systems from MICROSOFT CORPORATION of Redmond, Wash. The application program 29 may be written in any suitable programming language, such as Visual Basic, for updating the inventory in the inventory management system 40.

The mass storage device 14 is connected to the CPU 4 through a mass storage controller (not shown) connected to the bus 13. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the client computer 2 may operate in a networked environment using logical connections to remote computers, such as the server computer 49 and the inventory management system 40, through the network 18. The client computer 2 may connect to the network 18 through a network interface unit 20 connected to the bus 13. It should be appreciated that the network interface unit 20 may also be utilized to connect to other types of networks and remote computer systems. The client computer 2 may also include an input/output controller 22 for receiving and processing input from a number of devices, including a keyboard, mouse, or electronic stylus (not shown in FIG. 2).

Similarly, an input/output controller 22 may provide output to a display screen, a printer, or other type of output device. Although not specifically described herein, it should be understood that the server computer 49 described in FIG. 1 above may also include many of the same components described above with respect to the client computer 2.

Figure 3:
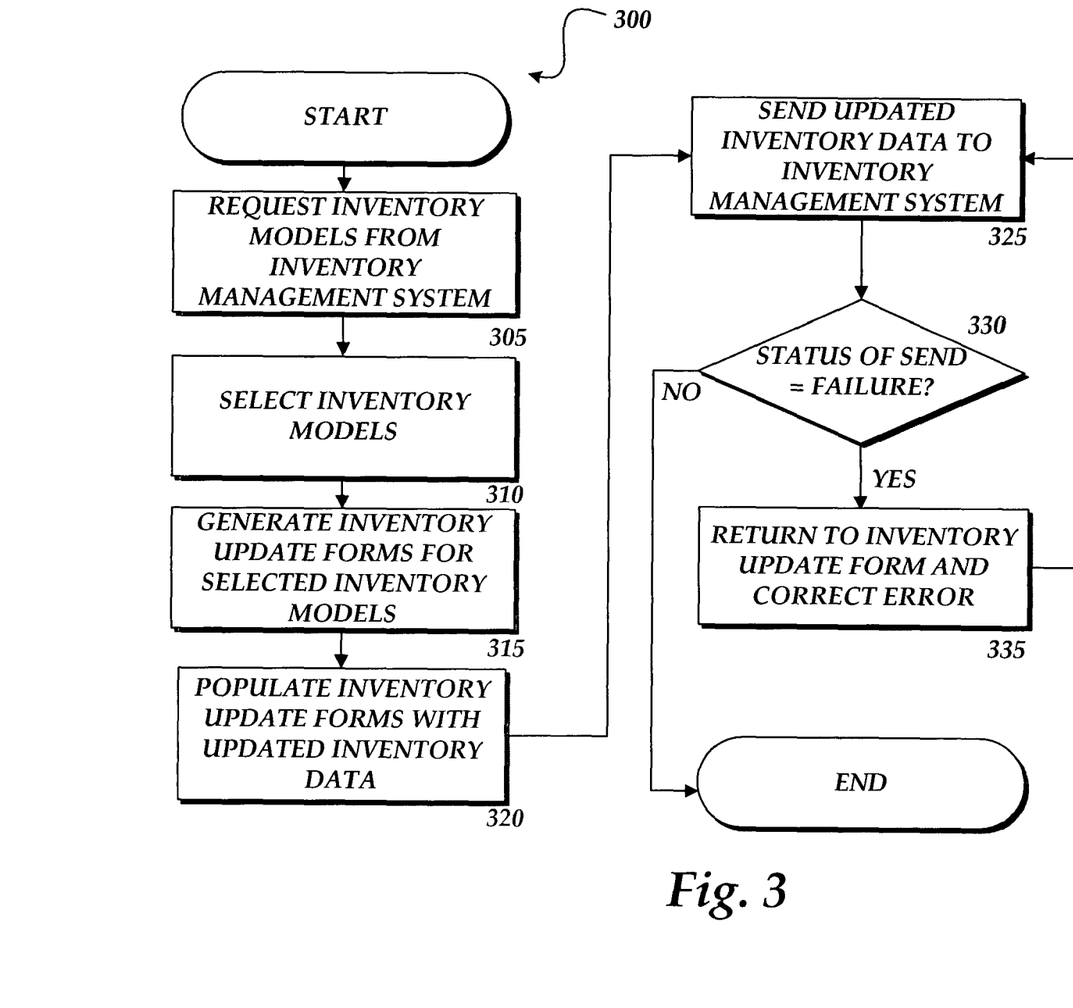
FIG. 3 illustrates logical operations performed in the computer network of FIG. 1 for updating inventory in an inventory management system according to an embodiment of the invention.

FIG. 3 illustrates logical operations 300 performed in the computer network of FIG. 1 for updating inventory data in an inventory management system according to an embodiment of the invention. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The logical operations 300 of FIG. 3 begin at operation 305 where a user of the application program 29 initiates a request for inventory models from the inventory management system 40. As discussed above, the inventory management system 40 is utilized in the management of inventory, such as facilities and equipment. The inventory management system 40 may also store inventory data related to the configuration of equipment in a network. One type of inventory data which may be stored is an inventory model which is default or standard configuration data for inventoried equipment in the inventory management system. For example, in a telecommunications network, an inventory model for a piece of central office equipment may include a description, an equipment code, the location of the equipment in the central office, and cabling assignments for wiring the equipment to other central office equipment such as a digital cross connect ("DSX"). Typically, inventory models are entered into the inventory management system by network personnel for each piece of equipment in the network. Once an inventoried piece of equipment is installed in a network, the inventory model is often supplemented with customized or updated configuration data related to specific operating parameters for the equipment by the equipment vendor. The updated inventory data may also be stored in the inventory management system once a piece of equipment has been configured for operation. In requesting inventory models, the application program 29 may call upon the screen scraper program 38 on the server computer 49 over the network 18.

Figure 4:
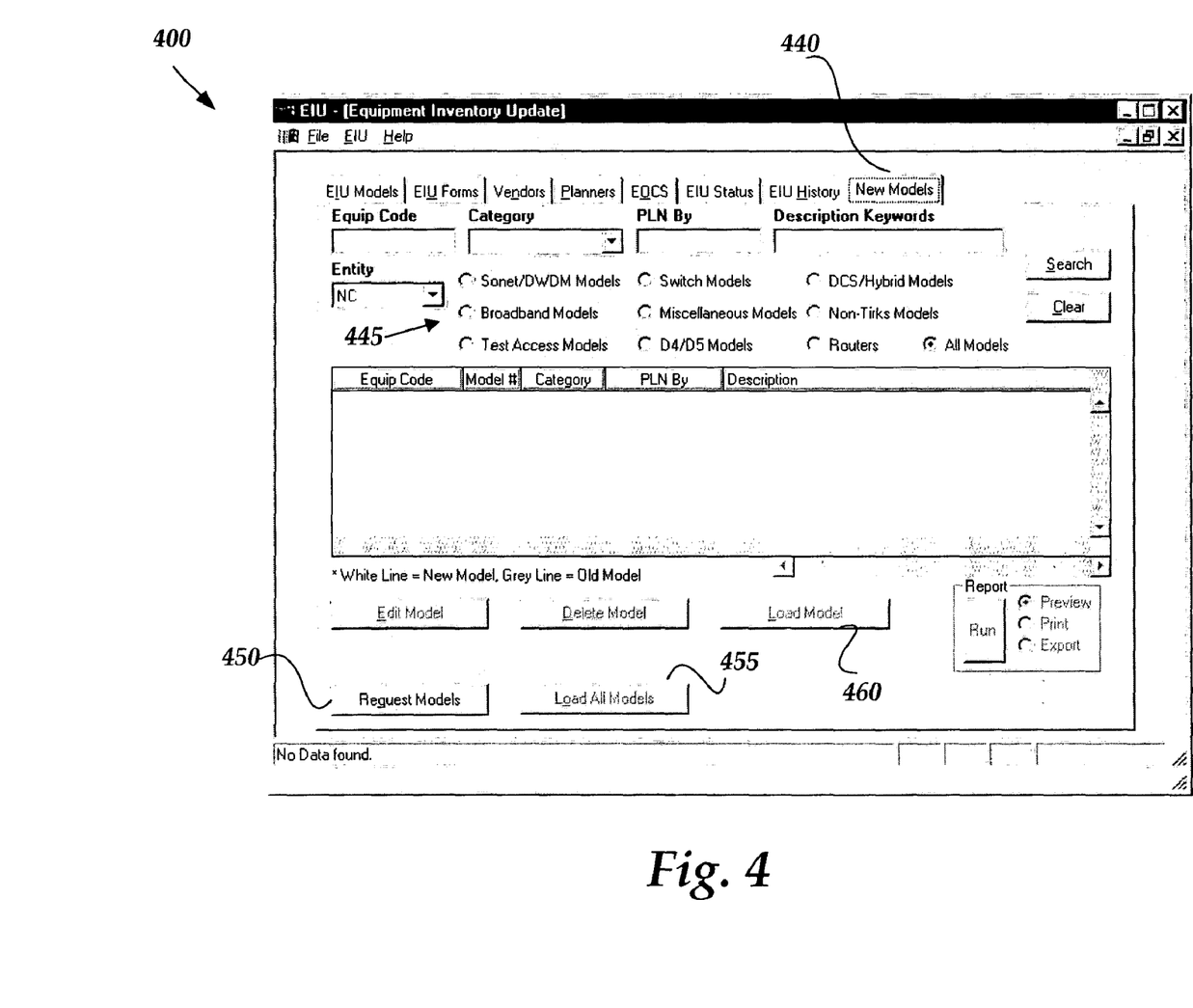
FIG. 4 illustrates a screenshot of a user interface generated by the application program illustrated in FIGS. 1-2 for requesting model inventory data, according to an embodiment of the invention.

FIG. 4 illustrates a screenshot of a user interface 400 generated by the application program 29 for requesting model inventory data, according to an illustrative embodiment of the invention. As shown in FIG. 4, the user interface 400 includes a New Models tab 440 for displaying a screen for requesting models of telecommunications equipment from the inventory management system 40. A model request may be initiated by a user selecting the Request Models button 450. Once the requested models have been received, they may be loaded into the application program 29 via the Load All Models button 455 (for all models) or the Load Model button 460 (for selecting individual models).

Returning now to FIG. 3, after a user of the application program 29 requests inventory models from the inventory management system 40, the logical operations 300 continue at operation 310 where the application program 29 selects one or more of the requested inventory models which have been received from the inventory management system 40. As discussed above, the inventory models are retrieved from the inventory management system 40 by execution of the screen scraper program 38 stored on the server computer 49. The screen scraper program 38 may be configured to login and establish a host session on the inventory management system 40. Once the host session has been established, the screen scraper program 38 accesses and then copies or captures the screens displaying the inventory models on the inventory management system 40 mainframe and saves them to a file on the server computer 49. The application program 29 then retrieves the screen scraper file containing the inventory models from the server computer 49 over the network 18 connected to the network interface unit 20.

Figure 5:
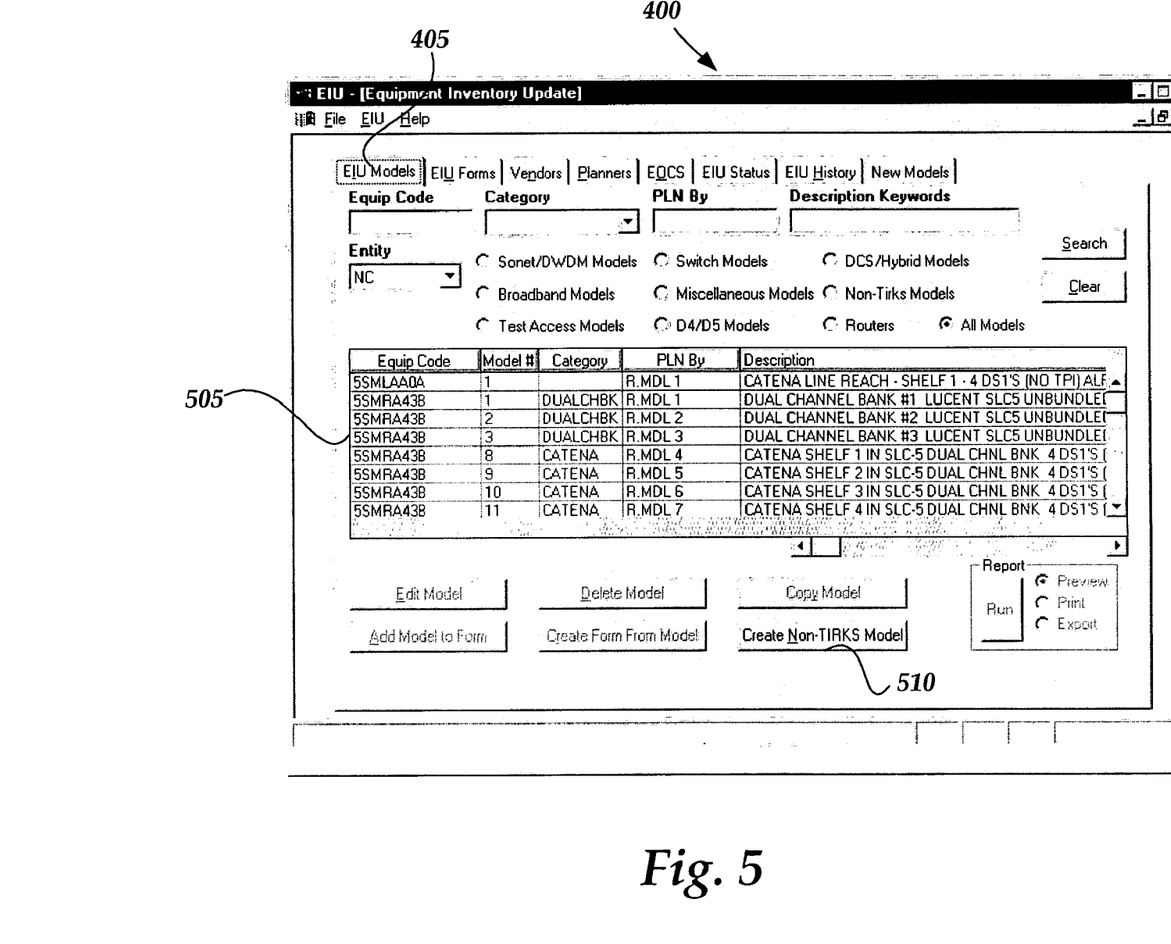
FIG. 5 illustrates a screenshot of a user interface generated by the application program illustrated in FIGS. 1-2 for listing model inventory data, according to an embodiment of the invention.

FIG. 5 illustrates a screenshot of the user interface 400 generated by the application program 29 showing a listing of retrieved inventory models, according to an illustrative embodiment of the invention. As shown in FIG. 5, the user interface 400 includes a Models tab 405 for displaying the list 505 of retrieved models for telecommunications equipment.

Returning now to FIG. 3, after a user of the application program 29 has selected one or more of the retrieved inventory models at operation 310, logical operations 300 continue to operation 315 where a user of the application program 29 generates inventory update forms for entering configuration data for each of the selected models. For example, a user may generate inventory update forms from a model for vendor supplied equipment to be installed in a central office. As discussed above, the configuration data entry may be made by an equipment vendor with local or remote access to the application program 29 on the client computer 2.

Figure 6:
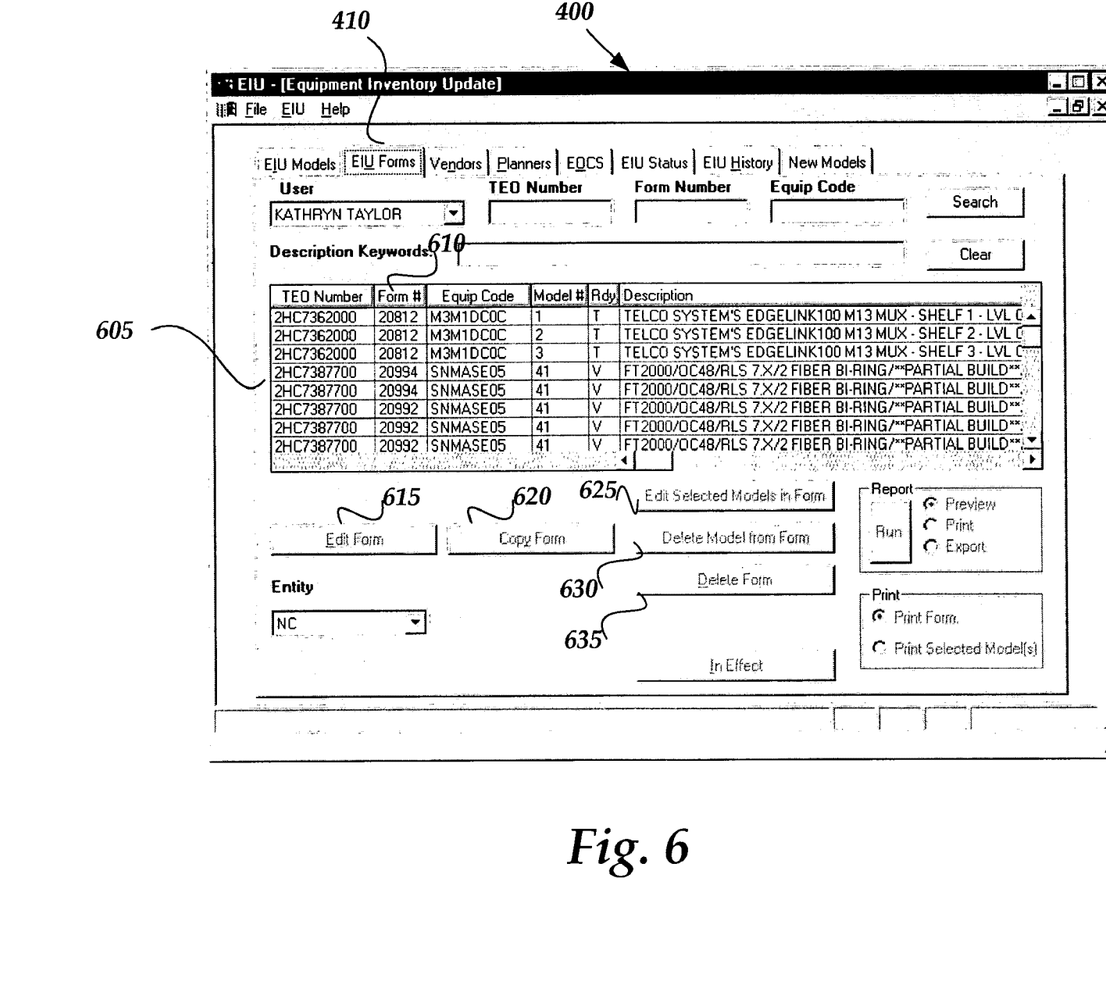
FIG. 6 illustrates a screenshot of a user interface generated by the application program illustrated in FIGS. 1-2 for listing forms generated from model inventory data, according to an embodiment of the invention.

FIG. 6 illustrates a screenshot of the user interface 400 generated by the application program 29 showing a listing of inventory update forms, according to an illustrative embodiment of the invention. As shown in FIG. 6, the user interface 400 includes a Forms tab 410 for displaying a screen showing a list 605 of inventory update forms (listed by number in the Forms# column 610) for retrieved models of telecommunications equipment. One or more forms may be selected and edited by selecting button 615 or copied by selecting button 620.

Figure 7:
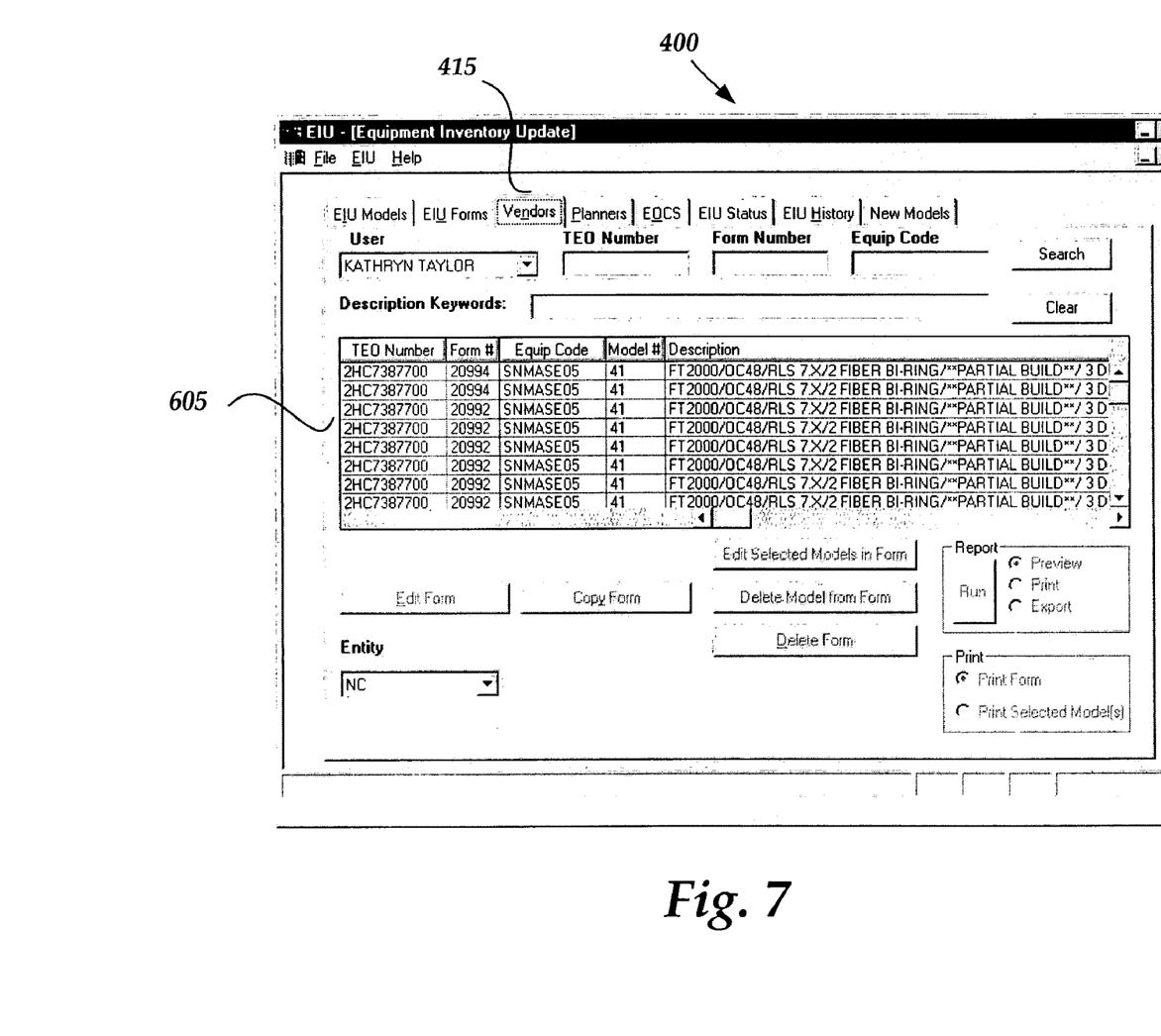
FIG. 7 illustrates a screenshot of a user interface generated by the application program illustrated in FIGS. 1-2 showing a vendor screen listing forms generated from model inventory data, according to an embodiment of the invention.
Figure 8:
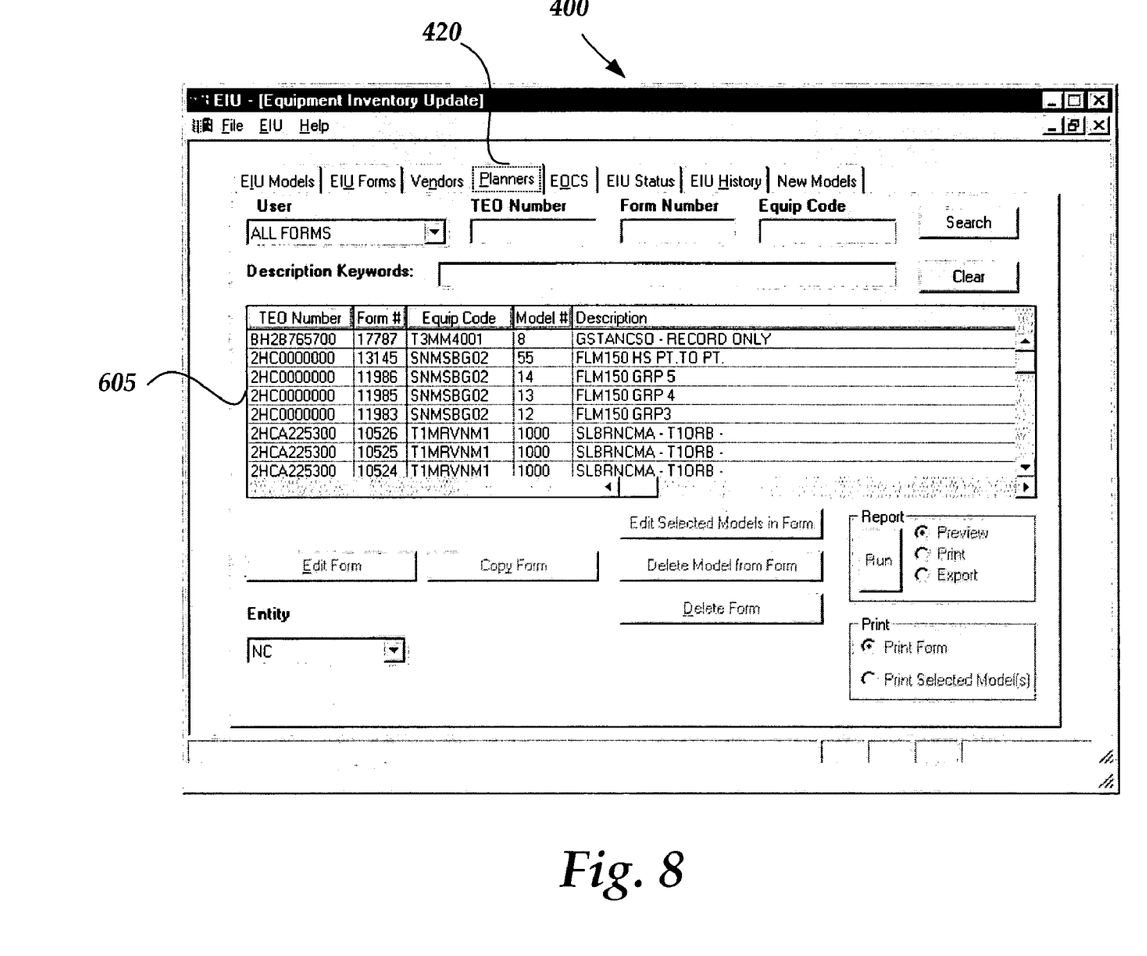
FIG. 8 illustrates a screenshot of a user interface generated by the application program illustrated in FIGS. 1-2 showing a planners screen listing forms generated from model inventory data, according to an embodiment of the invention.

FIGS. 7-8 also illustrate screenshots of the user interface 400 generated by the application program 29 showing a listing of inventory update forms, according to an illustrative embodiment of the invention. FIG. 7 illustrates a screen showing a copy of the list 605 of inventory update forms shown under the Forms tab 410 when the Vendors tab 415 is selected, giving equipment vendors access to inventory model data for entering updated configuration data. Similarly, FIG. 8 illustrates a screen showing a copy of the list 605 of inventory update forms shown under the Forms tab 410 when the Planners tab 420 is selected. This screen may be used by network capacity managers or planners to review and/or approve the updated configuration data added by equipment vendors to the forms.

Figure 11:
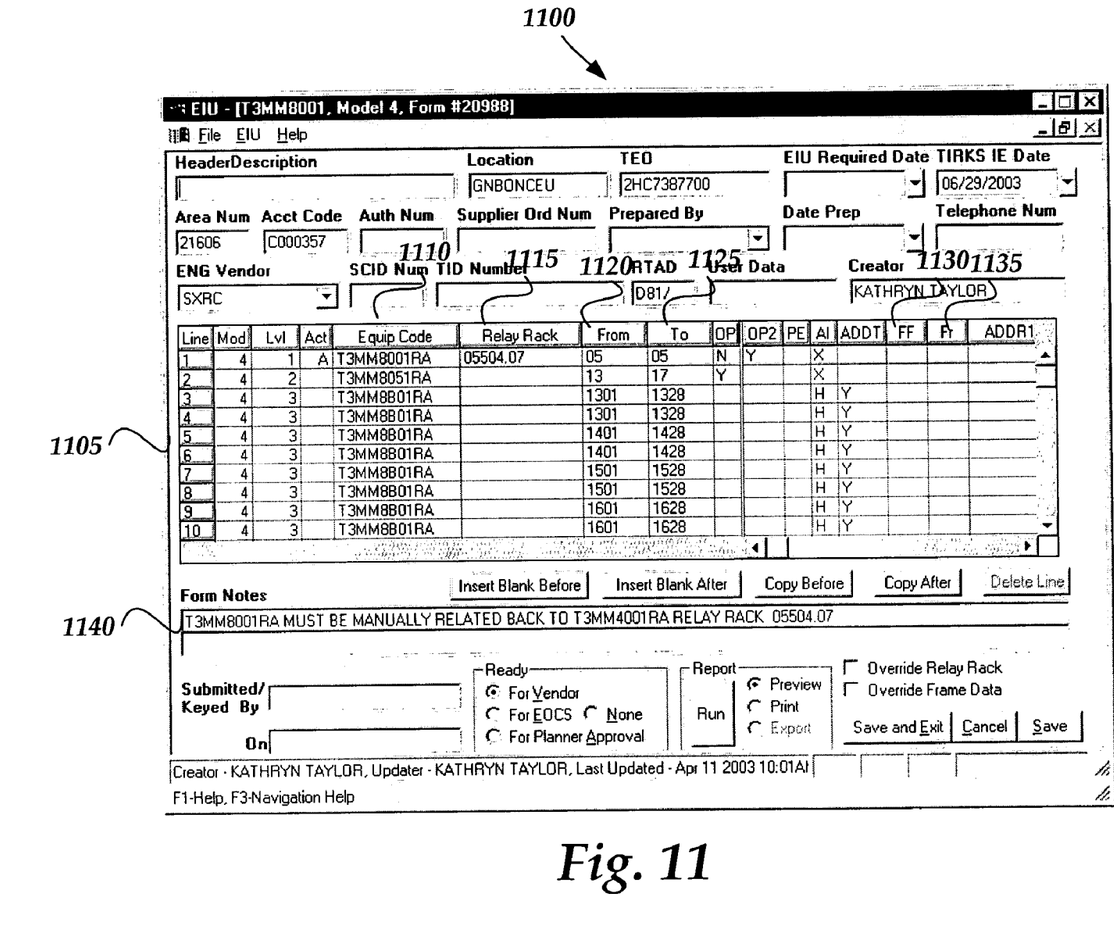
FIG. 11 illustrates a screenshot of a user interface generated by the application program illustrated in FIGS. 1-2 showing a form for entering updated inventory data, according to an embodiment of the invention.

Returning now to the logical operations 300 of FIG. 3, after the user of the application program 29 generates inventory update forms for entering updated configuration data for the selected inventory models, the logical operations 300 continue at operation 320 where the inventory update forms are populated with the updated inventory data by a user (e.g., an equipment vendor) in the application program 29. FIG. 11 illustrates a screenshot of an inventory update form 1100 generated by the application program 29 which may be utilized by telecommunications equipment vendors for adding updated inventory data for a selected inventory model, according to an illustrative embodiment of the invention. As shown in FIG. 11, the inventory update form screen shows a table 1105 displaying columns for model and updated configuration data for a piece of telecommunications equipment. The model data may be entered in a Relay Rack column 1115 for displaying the location of the equipment (i.e., rack location) in a central office, and From and To columns 1120 and 1125 respectively for displaying the physical cable assignments for the equipment. The updated inventory data, which may include operating parameters for the equipment, may be entered by a vendor in the FF ("Frame Format") and Fr ("Frame") columns 1130 and 1135 respectively for displaying frame data information for the equipment. Additional inventory data may also be added by the vendor, as applicable, to define the operating parameters for a particular piece of inventoried equipment. The inventory update form screen may also include a Notes section 1140 for planner or vendor comments regarding a specific piece of equipment.

Returning now to the logical operations 300 of FIG. 3, after the inventory update forms are populated with the updated inventory data by a user in the application program 29, the logical operations 300 continue at operation 325 where a user of the application program 29 sends the updated inventory data to the inventory management system 40. In one embodiment of the invention, after the updated inventory data has been entered in the application program 29, it is stored in the inventory management database 56. The updated inventory data is then sent from the inventory management database 56 to the inventory management system 40 to update the inventory data. The updated inventory data may be sent by calling upon the screen scraper program 38 to log into the inventory management system 40 and save the updated inventory data. Alternatively, a user of the application program 29 may manually enter the updated inventory data into the inventory management system 40 through the network 18 (via the network interface unit 20) connecting the client computer 2 to the inventory management system 40.

The application program 29 may also indicate the status of the sent updated inventory data at operation 330. If at operation 330, the application program 29 determines that the transmission of updated inventory data to the inventory management system 40 has failed, it will display an error message (e.g., "Failed") in the user interface 400. At operation 335, a user may then return to the inventory update form containing the updated inventory data to determine the source of the error (e.g., a vendor data entry error) and correct it. The logical operations then return to operation 330 where the user attempts to resend the updated inventory data. If, on the other hand, at operation 330 the application program 29 determines that the transmission of the updated inventory data to the inventory management system 40 was successful, it may display a success message in the user interface.

Figure 9:
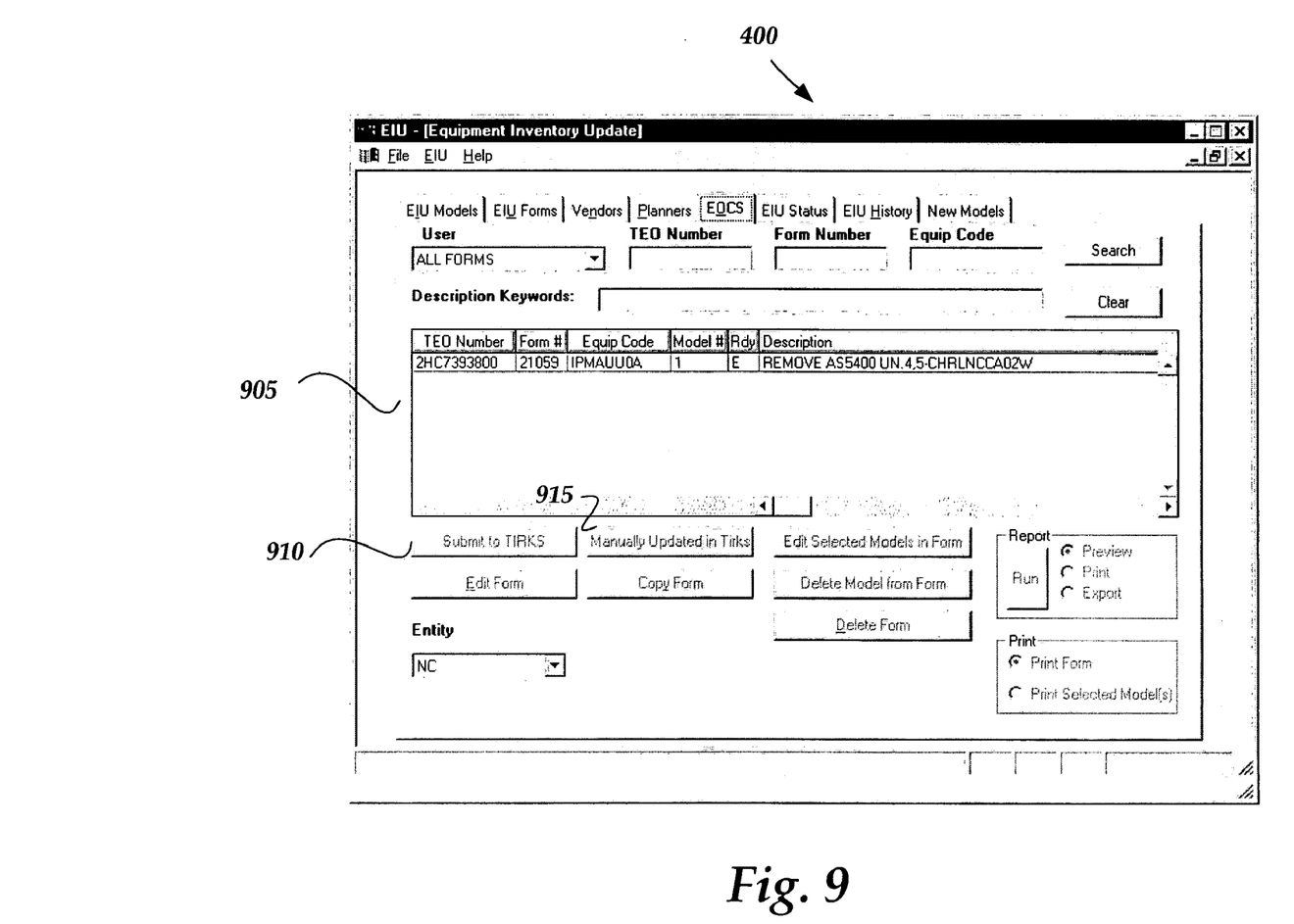
FIG. 9 illustrates a screenshot of a user interface generated by the application program illustrated in FIGS. 1-2 showing a form prior to being submitted to an inventory management system, according to an embodiment of the invention.

FIG. 9 illustrates a screenshot of the user interface 400 generated by the application program 29 showing a form containing updated inventory data prior to being submitted to the inventory management system 40, according to an illustrative embodiment of the invention. As shown in FIG. 9, a submit button 910 is shown for submitting the updated inventory data in the form shown in the window 905 to the inventory management system 40. As discussed briefly above, the updated inventory data may be sent by calling upon the screen scraper program 38 to log into the inventory management system 40 and save the updated inventory data. Alternatively, a user of the application program 29 may manually enter the updated inventory data directly into the inventory management system 40 by printing the form containing the updated inventory data and then logging into the inventory management system 40 to establish a host session with the client computer 2 through the network 18 (via the network interface unit 20) for entering the updated inventory data. Once the inventory data has been manually entered into the inventory management system 40, a user of the application program 29 may confirm the data entry by selecting the Manually Updated button 915.

Figure 10:
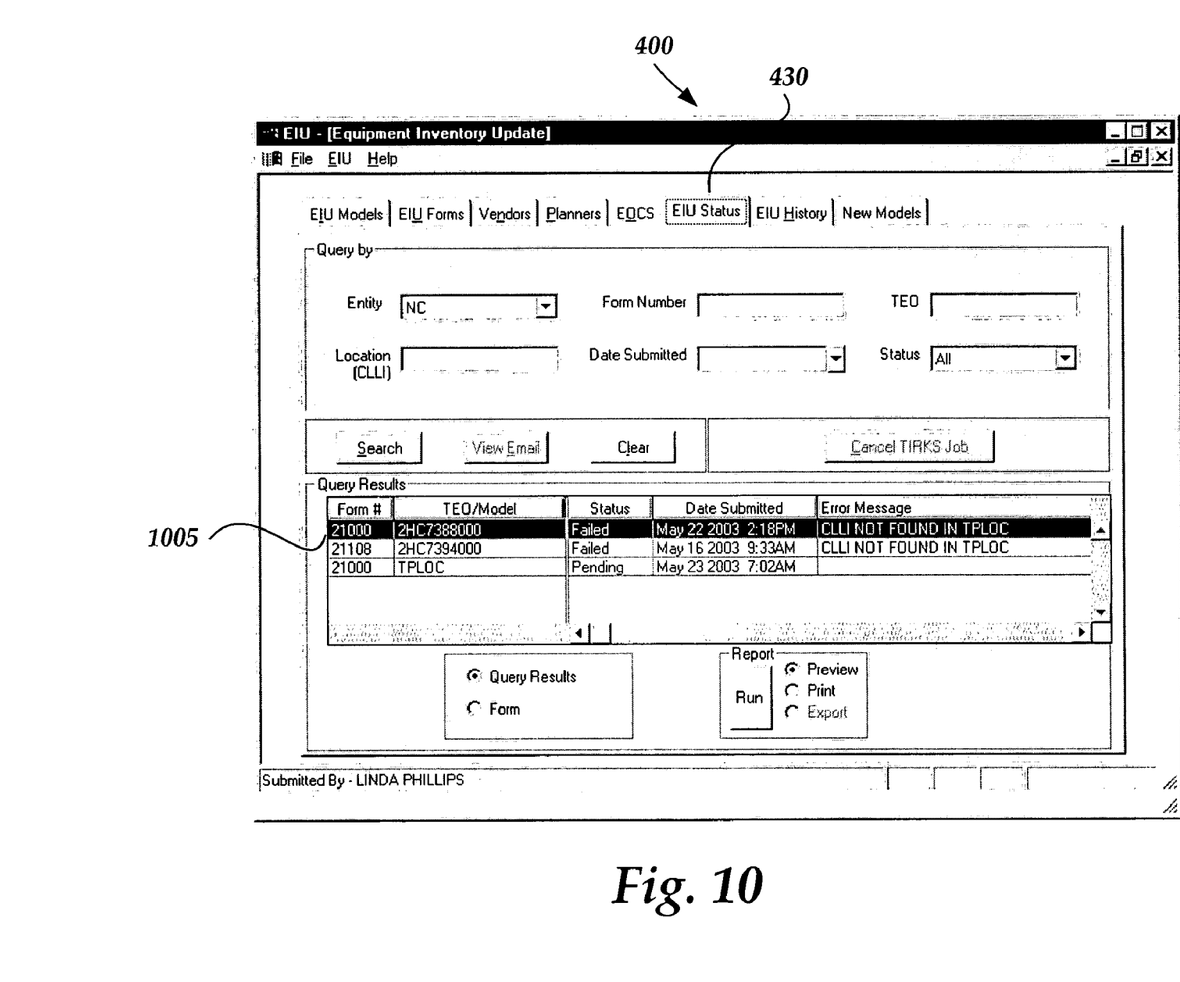
FIG. 10 illustrates a screenshot of a user interface generated by the application program illustrated in FIGS. 1-2 showing a status screen indicating the status of forms submitted to the inventory management system, according to an embodiment of the invention.

FIG. 10 illustrates a screenshot of the user interface 400 generated by the application program 29 showing the status of updated inventory data in forms displayed in a window 1005, after being submitted to the inventory management system 40, according to an illustrative embodiment of the invention.

It will be appreciated by those skilled in the art that the updating of inventory data in an inventory management system is facilitated by mechanizing the process of generating inventory update forms such that human error resulting from the manual preparation of such forms is reduced. Furthermore, it will be appreciated that mechanizing the entry of updated inventory data in an inventory management system reduces the time and human error which previously resulted from the manual entry of such data.

Although the invention has been described in language specific to telecommunications networks and telecommunications equipment, it is to be understood that the description of such networks and equipment are disclosed only as illustrative embodiments implementing the claimed invention and thus should not be construed as limiting. Moreover, although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as illustrative embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method of automatically updating inventory data in an inventory management system, the method comprising:
    in a computer software application, requesting, using a user interface of the inventory management system, a plurality of inventory models from the inventory management system, the plurality of inventory models comprising default configuration data for telecommunications equipment in a central office in a telecommunications network, wherein the default configuration data comprises a cabling assignment for wiring between at least two pieces of central office equipment;
    selecting, using the user interface of the inventory management system, at least one model from the plurality of requested inventory models;
    generating, using the user interface of the inventory management system, an inventory update form for each of the plurality of inventory models in the software application program;
    automatically populating each inventory update form with updated inventory data in the software application program, the updated inventory data comprising specific operating parameters for the inventoried equipment in the inventory management system; and
    sending, using the user interface of the inventory management system, the updated inventory data from the software application program to the inventory management system.

2. The method of claim 1, further comprising:
    determining the status of the updated inventory data sent to the inventory management system; and
    if the status of the updated inventory data id failed, then resending the updated inventory data to the inventory management system.

3. The method of claim 1, further comprising updating the inventory management system with the updated inventory data.

4. The method of claim 3, wherein updating the inventory management system with the updated inventory data comprises saving the updated inventory data in the inventory management system.

5. The method of claim 1, wherein requesting a plurality of inventory models from the inventory management system comprises:
    automatically logging into the inventory management system;
    retrieving the plurality of inventory models from a database in the inventory management system;
    retrieving provisioning data for the inventoried equipment in the inventory management system from an external database, wherein the provisioning data comprises data for provisioning special service circuits, message trunks, and carrier circuits associated with the inventoried equipment in a telecommunications network; and
    saving the plurality of the inventory models to a file.

6. The method of claim 1, wherein sending the updated inventory data from the software application program to the inventory management system comprises:
    sending the updated inventory data to an inventory management database;
    logging into the inventory management system; and
    sending the updated inventory data from the inventory management database to the inventory management system.

7. The method of claim 1, wherein the plurality of inventory models comprise default configuration data for inventoried equipment in the inventory management system.

8. The method of claim 1, wherein the updated inventory data comprises specific configuration data for inventoried equipment in the inventory management system.

9. The method of claim 1, further comprising retrieving, from an external database, provisioning data for the inventoried equipment in the inventory management system.

10. The method of claim 1, wherein requesting a plurality of inventory models from the inventory management system also comprises requesting at least one of an updated equipment code and an updated equipment location in the central office.

11. A computer system for automatically updating inventory data, the computer system comprising:
    a remote computer in the computer system for storing a database comprising inventory model data, the inventory model data comprising default configuration data for telecommunications equipment of a central office in a telecommunications network, wherein the default configuration data comprises a cabling assignment for wiring between at least two pieces of central office equipment;

a network interface;
a client computer, in communication with the remote computer over the network interface, the client computer comprising:
a memory device for storing a program file; and
a processor, functionally coupled to the memory device, the processor being responsive to computer-executable instructions contained in the program file, wherein the program file comprises a user interface for:
requesting the inventory model data from the database;
selecting one or more inventory models from the requested inventory model data;
generating an inventory update form from the one or more selected inventory models;
automatically populating the inventory update form with the updated inventory data, the updated inventory data comprising specific operating parameters for the inventoried equipment in the inventory management system; and
storing the updated inventory data in the database.

12. The computer system of claim 11, wherein the inventory model data comprises default configuration data for inventoried equipment stored in the database.

13. The computer system of claim 11, further compromising retrieving, from an external database, provisioning data for the inventoried equipment in the inventory management system.

14. The computer system of claim 11, wherein the default configuration data for a central office also comprises at least one of an equipment code and an equipment location.

15. A system for automatically updating inventory data in an inventory management database, the system comprising:
a client computer;
a remote computer;
a network connection between the local computer and the remote computer allowing data transfer therebetween;
wherein the remote computer comprises:
an inventory management database for storing inventory model data, the plurality of inventory models comprising default configuration data for telecommunications equipment in a central office in a telecommunications network, wherein the default configuration data comprises a cabling assignment for wiring between at least two pieces of central office equipment;
a software application program, residing on the remote computer, for automatically retrieving the inventory model data from the database;
wherein the local computer comprises:
a user interface for:
requesting the software application program to retrieve the inventory model data from the inventory management database;
selecting at least one inventory model from the received inventory model data;
generating an inventory update form from the at least one selected inventory model;
automatically populating the inventory update form with the updated inventory data, the updated inventory data comprising specific operating parameters for the inventoried equipment in the inventory management system; and
sending the updated inventory data to the inventory management database.

16. The system of claim 15, wherein the software application program is a screen scraper application program operative to intercept character-based data from a mainframe computer.

17. A computer-readable medium having computer-executable instructions, which when executed by a computer, cause the computer to perform the steps of:
requesting a plurality of inventory models from an inventory management system, the plurality of inventory models comprising default configuration data for telecommunications equipment in a central office in a telecommunications network, wherein the default configuration data comprises a cabling assignment for wiring between at least two pieces of central office equipment;
selecting at least one of the plurality of inventory models from the inventory management system;
generating an inventory update form for each of the selected inventory models;
automatically populating each inventory update form with updated inventory data, the updated inventory data comprising specific operating parameters for the inventoried equipment in the inventory management system;
sending the updated inventory data to the inventory management system'
updating the inventory management system with the updated inventory data; and
retrieving, from an external database, provisioning data for inventoried equipment in the inventory management system, wherein the provisioning data comprises data for provisioning at least one of special circuits, message trunks, and carrier circuits associated with the inventoried equipment in a telecommunications network.

18. The computer-readable medium of claim 17, wherein the default configuration data for a central office also comprises at least one of an equipment code and an equipment location.

* * * * *